(12) United States Patent
Kanefield et al.

(10) Patent No.: US 11,893,433 B1
(45) Date of Patent: Feb. 6, 2024

(54) LEVERAGING A UNIFORM RESOURCE LOCATOR (URL) TO PRODUCE A CORRESPONDING MACHINE-READABLE LABEL

(71) Applicant: the dtx company, New York, NY (US)

(72) Inventors: Nathaniel Kanefield, New York, NY (US); Sumer P. Rathinam, New York, NY (US); Matthew Ritonia, Arlington, VA (US); Jacob M. Skinner, New York, NY (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 18/220,481

(22) Filed: Jul. 11, 2023

(51) Int. Cl.
*G06K 19/06* (2006.01)

(52) U.S. Cl.
CPC ... *G06K 19/0614* (2013.01); *G06K 19/06037* (2013.01)

(58) Field of Classification Search
CPC ......... G06K 19/06103; G06K 19/0614; G06K 19/06037
USPC ....................................................... 235/494
See application file for complete search history.

(56) References Cited

U.S. PATENT DOCUMENTS

| | | | |
|---|---|---|---|
| 2013/0112760 A1* | 5/2013 | Schory ............. | G06K 19/06112 235/494 |
| 2013/0144698 A1* | 6/2013 | De ......................... | G06Q 30/02 705/14.22 |
| 2014/0110468 A1* | 4/2014 | Kandregula ........ | G06F 16/9566 235/375 |
| 2015/0324946 A1* | 11/2015 | Arce ..................... | G06T 1/0007 382/251 |
| 2016/0307084 A1* | 10/2016 | Cheung ................ | G06K 7/1417 |

* cited by examiner

*Primary Examiner* — Paultep Savusdiphol
(74) *Attorney, Agent, or Firm* — Weiss & Arons LLP

(57) ABSTRACT

Apparatus and methods for mining a Uniform Resource Locator ("URL") are provided. A method according to the embodiments includes generating a quick-response ("QR") code including a data zone, a position detection pattern and an environmental zone. The method further includes storing an application programming interface ("API") in a memory. The API is for retrieving a Uniform Resource Locator ("URL") from a selected location. The URL includes a logo. The method also includes building the data zone, the position detection pattern and the environmental zone of the QR code based on the URL—and creating dark and light color categorization of a plurality of colors derived from the URL.

15 Claims, 10 Drawing Sheets
(6 of 10 Drawing Sheet(s) Filed in Color)

LEVERAGING A UNIFORM RESOURCE LOCATOR (URL) TO PRODUCE A CORRESPONDING MACHINE-READABLE LABEL

FIELD OF TECHNOLOGY

Aspects of the disclosure relate to technology for generating machine-readable optical labels such as quick-response ("QR") codes.

BACKGROUND

QR codes provide businesses with a fast and efficient medium for connecting with consumers. Instructions, such as URLs contact information and other alphanumeric information may be encoded in QR codes. Businesses may leverage QR codes to guide consumers to a desired destination (real or virtual) where the customers can access products or services provided by the business. However, a scanning device is needed to scan and interpret the instructions encoded in a QR code.

In 2010, 62.6 million people in the United States used smartphones. In 2020 that number is predicted to more than quadruple to 272.6 million. Commensurate with increased smartphone use is integration of technology into smartphones that scans and interprets QR codes. Today, many smartphones include a native camera application that can recognize QR codes. There is no need to download and install a separate QR reader application or use the separate QR reader to scan a QR code.

QR codes now potentially offer an inexpensive means of providing many consumers with easy access to products or services. Consumers are already using their smartphones to search for more information about a product/service of interest. Now, businesses can tap into this tendency by using QR codes to guide consumers to targeted content associated with a product/service. Furthermore, QR codes are inexpensive and easy to print on a variety of surfaces such as business cards, product packaging, posters or marketing materials.

However, one hurdle still facing widespread adoption of QR codes is that the instructions encoded in a QR code must follow regimented protocols. The regimented protocols ensure that encoded instructions can be successfully scanned and interpreted by a smartphone. Altering the regimented protocols to generate a QR code that includes aesthetic designs may interfere with the ability of a smartphone to reliably scan and interpret the encoded instructions.

It would be desirable to provide apparatus and methods for generating QR codes that include aesthetic designs that do not interfere with the ability of a smartphone to scan and interpret the encoded instructions. Accordingly, it is desirable to provide apparatus and methods for a MACHINE-READABLE LABEL GENERATOR.

SUMMARY OF THE DISCLOSURE

It is an object of this disclosure to provide a software platform for generating a quick-response ("QR") code. The QR code preferably includes a data zone, a position detection pattern and an environmental zone. The software platform includes a memory storing an application programming interface ("API"). The API is configured for retrieving a Uniform Resource Locator ("URL") from a selected location. The URL includes a logo.

The platform may include a processor for building the data zone. The position detection pattern and the environmental zone of the QR code may be based on the URL. The processor may be used to construct the data zone by increasing a set of logo dimensions with respect to an overall area of the data zone. The processor may be further configured to create a dark and light color categorization of a plurality of colors derived from the URL. The processor may be configured to limit a level of brightness to enforce 5:4 contrast ratios for a set of background elements in the QR code with respect to a set of foreground elements in the QR code.

The processor may be configured to pull two colors from the URL and place the darker color in the foreground and the lighter color in the background.

The processor may be configured to select only red colors, blue colors and black colors to form the QR code.

The processor may be configured to eliminate near-white colors and/or white colors from the QR code.

The processor may be further configured to search the URL to find a preferably minimum number of dark-color logos.

The memory may be used to store logo selection logic. The logo selection logic may instruct the processor to search the URL to identify a pre-determined minimum number of color logos in a specified color band. The number of color logos in the color band may be determined based on a pre-set value, based on artificial intelligence derived from legacy selections, and/or based on a human input number.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
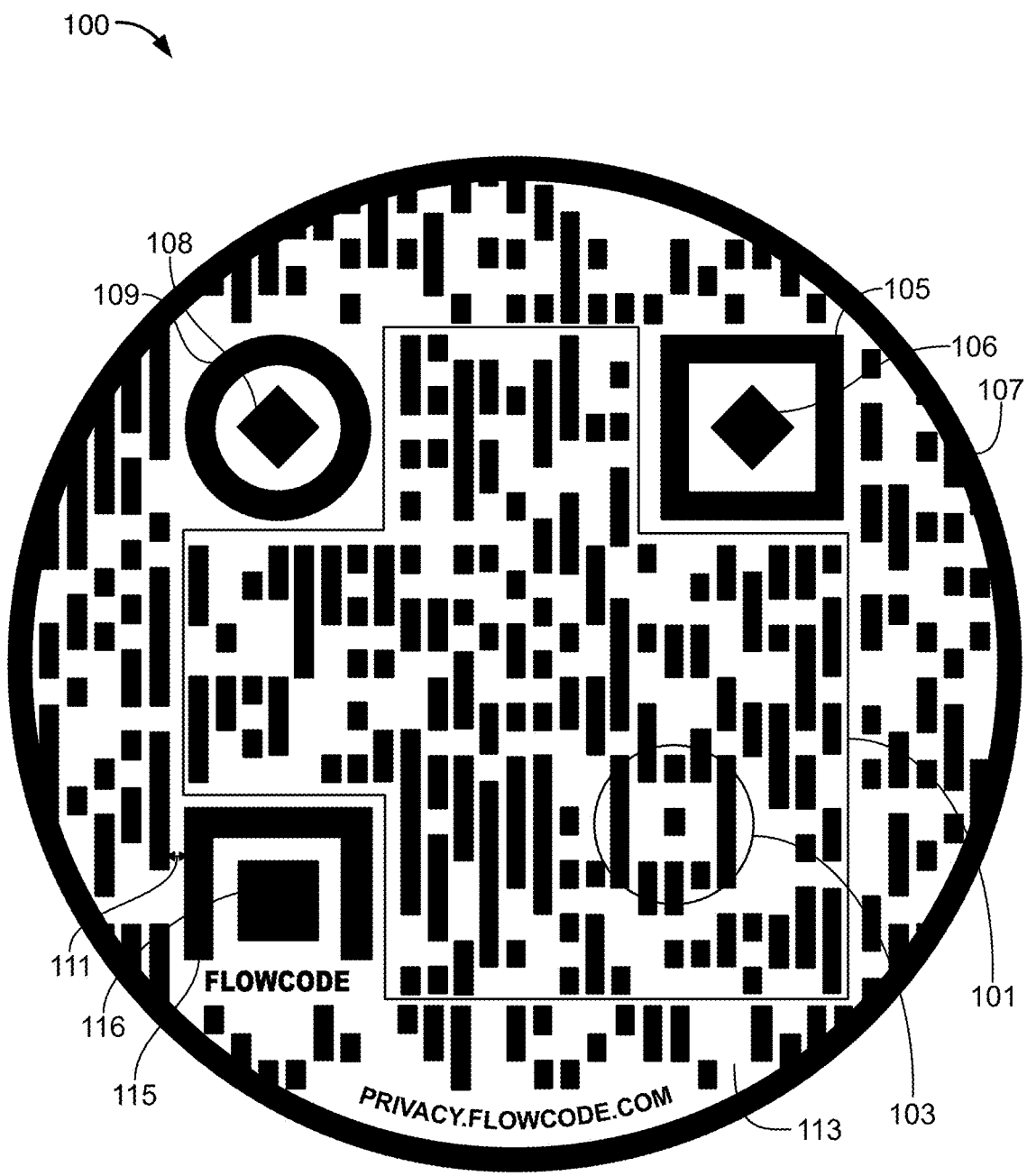
FIG. 1 shows an illustrative apparatus in accordance with principles of the disclosure.

A system for generating a machine-readable optical label is provided. An illustrative machine-readable optical label may be a quick-response ("QR") code. Other illustrative machine-readable optical labels may include a linear barcode or a two-dimensional matrix barcode such as Aztec code, ShotCode, SPARQCode, and the like.

The system may include a software dashboard that provides access to software tools for entering one or more URLs for leveraging the URLs to produce a machine-readable optical label, such as a QR code. An associated software engine, software platform or hybrid hardware/software system, may generate a QR code based on the user-selected URL.

A QR code may include a plurality of modules. A module may be a dark module or a light module. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1.

A pattern of modules within a QR code may define a data zone, position detection patterns, timing patterns, an error correction level and error correction code. The data zone may include machine readable instructions that, when scanned, trigger an action on a device used to scan the QR code. For example, the QR code may include instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules a QR code will have to encode that information.

Position detection patterns may provide instructions that orient a scanning device to identify and read the data zone. Position detection patterns may include position markers. For example, a QR code may include three position markers ("eyes") at a top left, top right, and bottom left of the QR code. Position markers may be defined based on a pattern of light/dark modules. For example, a position marker may be spaced apart from the data zone by a border of light modules. The position marker may include an outer border of dark modules. The outer border may surround an inner border of light modules. The inner border of light modules may surround a core of dark modules. A position mark may be designed to include a pattern of modules that is unlikely to appear elsewhere within the QR code.

Each position marker may be linked to another position marker by a timing pattern. An illustrative timing pattern may include a horizontal line of alternating light/dark modules. An illustrative timing pattern may include a vertical line of alternating light/dark modules. Each line of alternating light/dark modules may start and end with a dark module.

The position detection pattern may include an alignment pattern. An alignment pattern may overlap a timing pattern. The alignment pattern may include one or more alignment markers. An illustrative alignment marker may include an outer border of dark modules surrounding an inner border of light modules and a single dark module in the center of the marker.

The alignment pattern may allow a scanning device to determine an orientation of the QR code. The alignment pattern may improve scanning speed of the QR code. The alignment pattern may include markers or a pattern that allows a scanning device to orient the QR code despite displacement of modules due to distortion. For example, the alignment pattern may allow a device to scan QR codes applied to a curved surface. Generally, a larger QR code will include more alignment patterns than a smaller QR code. Size of a QR code may be defined based on a number of modules included in the QR code.

The QR code may include error correction code. The error correction code may be included in the data zone. An illustrative error correction code may include Reed-Solomon codes. The error correction code may be applied to restore data encoded by modules when a segment of a QR code is missing or damaged. A QR code may include various levels of error correction.

Modules used for error correction store redundant copies of data that compensate for damaged modules that cannot be read by a scanner. An exemplary target error correction level may allow restoration of at least 15% of data bytes. The target error correction level is determined based on Reed-Solomon codes included in the QR code. Other illustrative target error correction levels may include:

Level L—7% of data bytes can be restored.
Level M—15% of data bytes can be restored.
Level Q—25% of data bytes can be restored.
Level H—30% of data bytes can be restored.

A QR code that includes a 30% error correction level will be scannable by a device even if 30% of the modules are damaged (soiled, washed out, faded, replaced with images). Generally, the higher level of error correction included in the QR code, the less instructions can be stored within a data zone of the QR code.

The system may include a software engine. The software engine may include software tools that enable a user to enter URLs. The software engine may generate a QR code based on URLs input by the user. The software engine may generate the QR code such that the QR code includes information correspondent to the user input URLs and has a target error correction level. The software engine may generate the QR code such that the QR code includes information correspondent to the user input URLs and is reliably scannable by a scanning device.

A QR code may include an environmental zone. The environmental zone may include a buffer of light modules that surround a data zone and associated position detection patterns. The buffer may allow a scanning device to distinguish the data zone from its surrounding environment zone. An illustrative buffer may be four light modules wide.

The software engine may generate an environmental zone for the QR code. The software engine may generate the buffer surrounding the data zone and position detection patterns. The software engine may generate modules for an environmental zone surrounding the data zone. The environmental zone of a QR code may include marks or designs that are not intended to be interpreted by a scanning device. The environmental zone may provide a QR code an aesthetic appearance that is different from a standardized appearance of a QR code. A standardized appearance of a QR code may be defined by one or more standards published by the International Organization for Standardization (ISO) of Geneva, Switzerland. Illustrative standards published by the ISO include ISO/IEC 18004:2015 and ISO/IEC 24778:2008 which are hereby incorporated herein by reference in their respective entireties.

The software engine may generate a data zone for the QR code. The software engine may generate the data zone based on information contained in URLs entered by a user. Exemplary URLs that may be presented by the software engine may include shapes, colors, color gradients and shading. The software engine may generate a QR code based on the user's selected URLs such that the QR code has a scan recognition speed of 3 seconds or less. The software engine may dynamically adjust formulation of the environmental zone based on user-selected URLs. The software engine may dynamically generate the data zone based, at least in part, on user-selected URLs.

In response to detecting user-selected URLs, the software engine may dynamically configure design choices applied to modules in the data zone to improve readability of the data zone. Illustrative changes may include alterations to size, shape, color of a module and position of a module relative to other modules. The software engine may change design choices automatically derived from the user-selected URLs to apply to modules in the data zone such that, even after applying the design choices, the generated QR code maintains a desired appearance associated with the design choices. Exemplary changes may include changing one or more of the following applied to modules within the data zone: color, contrast, skew, blur, sharpness, hue, tint, brightness, shade, shape, gradient, tone, and saturation.

Changes to modules within a data zone may include redistributing two or more design choices applied to modules within the data zone. For example, the software engine may generate a data zone that adheres to colors or a color gradient entered by a user, but may redistribute the colors as applied to individual modules within the data zone. Such a redistribution may improve readability of the data zone by a scanning device.

Changes applied to modules within the data zone may include revising a mask pattern applied to a generated QR code. A mask pattern may rearrange modules in the data zone that may confuse a scanner. For example, applying a mask pattern may ensure that a generated QR code does not include a threshold number of adjacent modules having the same color. Masking may eliminate module patterns that may be erroneously interpreted by a scanner as a location, position or timing marker.

In some embodiments, the software engine may suggest a combination of design choices for the environmental and data zones based on a user's entered URLs. The combination of design choices suggested by the software engine may generate a QR code that has a threshold level of readability and error correction. The software engine may be configured to show an illustrative QR code that minimizes the number of changes to the design choices derived from user-selected URL(s) and generates a QR code having the threshold level of readability and error correction.

The software engine may be configured to minimize the number of changes to the design choices such that an appearance of the generated QR code is within a threshold range of the design choices automatically derived from one or more user selected URL(s). The software engine may apply machine learning techniques, such as fuzzy logic, to define an "appearance" based on design choices derived from one or more user selected URL(s).

The software engine may limit the scope of design choices derived from one or more user selected URL(s) available to a user. For example, the software engine may limit the design choices derived from one or more user selected URL(s) to only allow generation of a QR code having a target scan error correction level.

The software engine may dynamically determine design choices available to the platform based on previously-derived design choices.

Exemplary design choices that may be presented by the software engine may include shapes, colors, color gradients and shading of one or more modules of the QR code. For example, design choices derived from one or more user selected URL(s) may include a shape or color of modules that define a position or timing marker of the QR code. A marker may include a plurality of modules arranged in specific positions with respect to each other.

Exemplary design choices that may be provided by the software engine include shapes, colors, color gradients and shading of modules patterns within a QR code. Exemplary patterns may include a position pattern, an alignment pattern and a timing pattern. A pattern may include two or more markers positioned in a desired arrangement. A pattern may be included within a data zone, environmental zone or any other part of the QR code.

The software engine may enable design choices that will be applied to a data zone of the QR code. A data zone may include modules that are arranged to encode computer executable instructions.

When the QR code is scanned, the executable instructions may configure the scanning device to perform a target function. For example, the executable instructions may launch a web browser resident on the scanning device and load a target landing page. The executable instructions may trigger any suitable function of the scanning device. Other illustrative functions may include launching an email/text application on the scanning device or generating a pre-formatted message.

The data zone may include modules defining version and format information of the QR code. The data zone may include modules defining error correction codes. The data zone may include modules defining timing, position and alignment patterns.

The software engine may enable production of design choices that will be applied to an environmental zone of the QR code. Illustrative design choices may include shapes, colors, color gradients and shading of modules or other marks included in the environmental zone.

The software engine may generate a QR code that includes the design choices based on the user-selected URLs. The software engine may generate a QR code that includes the design choices, constrained by an outer perimeter. An environmental zone may include all modules or marks positioned between a data zone and the outer perimeter. The environmental zone may include the outer perimeter. The software engine may be configured to produce a QR code having an outer perimeter having any suitable shape, such as circular, triangular, rectangular or trapezoidal outer perimeters. The software engine may generate fill for the environmental zone between the data zone and the perimeter.

The software engine may be configured to generate fill for the QR code. The fill may be a color or other design choice applied to light modules within the QR code. The software engine may generate fill that does not negatively impact a target scan speed or error correction level of the data zone.

Apparatus for a software platform for automatically generating a customized quick-response ("QR") code based on a URL is provided.

The platform may construct a data zone of the QR code. The platform may construct the data zone based on a first set of design choices derived from a user-selected URL. The platform may provide functionality for a user to select one or more URL(s) that will be leveraged to provide one or more QR-code-relevant design choices. The design choices may then be applied to the data zone. The design choices may include the following illustrative design choices for the data zone:

shape of modules within the data zone;
a color of modules within the data zone;

a color gradient applied to the modules within the data zone;

error correction level; and an image(s) or logo(s) displayed within the data zone.

Design choices for modules within the data zone may include design choices for light and dark modules. The platform may automatically construct a position detection pattern of the QR code. The platform may input design choices that will be applied to one or more position detection patterns of the QR code. The data zone may include one or more position detection patterns.

Modules within the position detection pattern may orient a device attempting to extract information from a QR code. A position detection pattern may include one or more modules that define a position marker (an "eye") of the QR code. The position marker may include modules arranged in a specific formation. A QR code may include position markers at one or more corners of the data zone. A QR code may include position markers at one or more borders of a data zone of the QR code. A scanning device may locate the data zone by detecting the position markers.

A position marker may allow a scanning device to quickly locate the data zone, facilitating high-speed scanning of the QR code. A position marker is designed to include an arrangement of modules unlikely to appear elsewhere within other zones of a QR code. An illustrative position marker may include module widths having a ratio of 1:1:3:1:1. A position marker may include an outer border of 7×7 dark modules, an inner border of 5×5 light modules, and an inner core of 3×3 dark modules. A scanning device may search the QR code for arrangements of modules having this ratio of light to dark modules, detect the position markers and then scan the data zone in an orientation for decoding. In some embodiments, one or more of the position members may be in the shape of square as opposed to round shapes. In other embodiments, one or more of the position members may be in the round shape instead.

The platform may define design choices for a position marker. A QR code may include two or more position markers. For example, an illustrative QR code may include three position markers. Illustrative automatic design choices for each position marker included in a position detection pattern may include:

a color of light modules included in the position marker;

a shape defined by light modules included in the position marker;

a shape defined by an outer border of dark modules of the position marker;

a shape defined by dark modules within the outer border of the position marker;

a color of dark modules that define the position marker;

a color gradient applied to modules included in the position marker; and image(s) or logo(s) displayed within the position marker.

A position detection pattern may include alignment markers. An alignment marker may include modules arranged in a specific formation. An exemplary alignment marker may include an outer border of 5×5 dark modules surrounding an inner border of 3×3 light modules and a single dark module in the center of the inner border. A location or orientation of the data zone of the QR code may be detected based on detecting one or more alignment markers. For example, an alignment marker may allow a scanning device to locate the data zone despite displacement of the QR code relative to the scanning device, such as when the QR code is bent or curved.

A position detection pattern may include one or more modules that define a timing pattern of the QR code. A timing pattern may include alternating dark and light modules. Timing patterns enable a scanning device to determine dimensions of a single module within the data zone. The arrangement of modules within the timing pattern enables a device scanning the QR code to follow a sequence of the executable instructions encoded in the data zone.

The platform may automatically construct an environmental zone of the QR code. The environmental zone may include modules that do not include any instructions for the scanning device. An environmental zone may include modules that are not intended to be decoded by a scanning device. An environmental zone may include a buffer of modules that demarcate the data zone within the QR code. The buffer of modules may be light modules. The platform may further provide functionality for deriving a set of design choices from a URL(s) that will be applied to the environmental zone.

The platform may automatically construct the environmental zone to enhance readability of the data zone by a scanning device. The platform may generate an environmental zone that appears, to a human eye, to be a contiguous extension of the data zone. The platform may generate an environmental zone having a user selectable aesthetic appearance. For example the platform may generate numerous QR-code choices from among which the user may select. The platform may generate an environmental zone that includes aspects defined by aspects defined by machine generated design choices.

The platform may automatically construct the data zone by adjusting construction of position detection patterns. The platform may apply machine generated design choices to the data zone. For example, the platform may adjust a layout or design of position detection patterns in the data zone. The platform may alter a default layout or design of modules within position detection patterns.

When generating modules within a data zone, the platform may prioritize readability of the data zone by a scanning device over applying default design choices to the data zone. For example, the platform may ensure the data zone maintains a threshold error correction level or that modules within the data zone are scannable within a target time window.

To maintain a threshold error correction level of the data zone, the platform may modify default design choices entered for modules within a position detection pattern or other modules of the data zone. The platform may modify the automatic design choices for modules within the position detection pattern or other modules of the data zone such that the data zone generated by the platform maintains an aesthetic appearance.

The software engine may apply computational aesthetic techniques to define an aesthetic appearance. Such techniques and models may be specially formulated to adhere to known requirements and standards for QR codes. Illustrative QR code standards may include ISO/IEC 18004:2015 and ISO/IEC 24778:2008.

The computational aesthetic techniques may include applying machine learning algorithms to define an aesthetic appearance. The machine learning algorithms apply to zones of a QR code default design choices. The design choices may be based, at least in part, on user design selections.

Illustrative design choices may include color, luminance, contrast, shape, intensity, edges, and sharpness of modules within a QR code. The machine learning algorithms may define, based on URL-related retrieved design elements, how the design choices impact human aesthetic judgment and identify regions of the QR code that may be relatively more or less important for human aesthetic judgment.

Illustrative computational techniques that may be used to define aesthetic appearance may include application of machine learning techniques, such as AdaBoost, Naive Bayes, Support Vector Machine, Random Forests, Artificial Neural Networks and Convolutional Neural Networks. Computational techniques may include applying image clustering unsupervised machine learning to define aesthetic appearance. Illustrative image clustering may include applying K-Means Clustering and Fuzzy Clustering.

Illustrative machine generated changes implemented by the platform may include altering default color design choices. Illustrative color design choices that may be altered include hue, tint, shade, tone, saturation, lightness, chromaticity and intensity. Illustrative machine generated changes may include redistributing colors applied to individual modules within a QR code.

The platform may alter a mask pattern applied to modules within a data zone. A mask pattern may be configured to reduce the number of hard-to-read module patterns present in a data zone. In some embodiments, the platform may construct the data zone by rearranging modules within an environmental zone.

The platform may automatically construct a position detection pattern by adjusting a construction (e.g., size, color, shape) of other modules within the data zone or modules within the environmental zone. For example, the platform may adjust an appearance of modules within the data zone by redistributing a color scheme to one or more modules within the data zone. The platform may resize or reposition modules within the data zone.

The platform may automatically construct the environmental zone by adjusting an appearance of modules within the data zone. The platform may adjust the data zone by changing a size of modules within the data zone. The platform may change a size of the modules determined by the first interface. The platform may change color or shape modules.

The platform, when constructing modules within the environmental zone, the data zone or position detection patterns, may maintain fidelity of executable instructions encoded in the data zone. Fidelity may refer to the executable instructions remaining, despite any aesthetic changes, reliably scanned and decoded by a scanning device.

For example, the platform may ensure that the executable instructions encoded in the data zone reliably trigger a target action when scanned regardless of design choices applied to the QR code.

The platform may conduct automated testing of a generated QR code. The automated testing may simulate fidelity of the generated QR code when scanned by different devices using different operating systems. The platform may maintain fidelity of executable instructions encoded in the data zone such that a QR code constructed based on the first, second and third sets of design choices is reliably scanned. Scan reliability may be defined by a data zone that can be read within a threshold time (e.g., 3 seconds) by each of a threshold number of devices. An illustrative threshold number of devices may include one or more devices. The threshold number of devices may include one or more software emulators configured to mimic a scanning device. The illustrative threshold number of devices may include at least one device from two or more manufacturers.

The platform may construct a QR code based on the URL such that the generated QR code includes a target error correction level. For example, when constructing the environmental zone, the data zone and position detection patterns, the platform may maintain fidelity of executable instructions encoded in the data zone such that the QR code includes error correction code for restoring at least 15% of the executable instructions in the data zone.

The software platform may reject at least one URL entered by a user. For example, the software platform may determine that if a QR code was generated based on the URL, the generated QR code would not include a target error correction level. The software platform may be configured to reject such URL-derived design choices.

The software platform may prompt the user to make changes to user-selections of URL(s). The software platform may suggest alternatives to the user's URL(s). The software platform may suggest changes based on defining an aesthetic appearance associated with the user-selected URL(s). The software platform may allow the user to override rejection of the URL(s). For example, the user may wish to generate a QR code having a desired aesthetic appearance, even though the software platform has determined that the QR code(s) derived from the selected URL will not include a target error correction level.

Methods for generating a quick-response ("QR") code are provided. Methods may include providing a default QR code. The default QR code may include a data zone. The data zone may include modules that encode executable instructions for triggering a target action when the default QR code is scanned. The data zone may include a position detection pattern, a timing pattern and an alignment pattern. Modules within the data zone may include dark and light modules.

Methods may include creating a first set of design choices for the data zone, where the design choices are based on a user-selected URL. Methods may include adjusting a default QR code such that the data zone conforms to the set of design choices. Methods may include applying the first set of design choices to the data zone such that, a resultant QR code will trigger the target action when scanned.

Methods may include creating a second set of design choices based on a user-selected URL for a position detection pattern. The position detection pattern may include at least one position marker. The position detection pattern may include buffer modules. The buffer modules may form a separator pattern that includes light modules separating an outer border of the position marker from other modules. The buffer modules may form a separator pattern that includes light modules separating modules in the data zone from modules in an environmental zone.

Methods may include applying the second set of design choices to the position detection pattern. Methods may include adjusting a configuration of the default QR code such that a resultant QR code conforms to the first and second sets of design choices and the data zone triggers the target action when scanned.

Methods may include creating a third set of design choices based on the user-selected URL. The third set of design choices corresponds to modules within an environmental zone. Methods may include adjusting the default QR code such that a resultant QR code conforms to the first, second and third sets of design choices and the data zone triggers the target action when scanned.

Adjusting the default QR code may include redistributing a color scheme applied to modules within a data zone of the default QR code. Adjusting the default QR code may include generating a new arrangement of modules for the environmental zone of the default QR code. The new arrangement may include determining whether each module within the environmental zone should be light or dark.

Methods may include adjusting the default QR code such that a resultant QR code conforms to the first, second and third sets of design choices and the data zone includes error correction code that restores at least 15% of instructions encoded in the data zone. Methods may include rejecting one or URL-derived design choices may be rejected when, after adjusting the default QR code, a resultant QR code will not include a target error correction level or threshold level of scan reliability.

An artificial intelligence ("AI") engine for generating a quick response ("QR") code is provided. The AI engine may generate the QR code based on a set of design choices. The design choices may be derived from a URL(s) selected by a user.

The AI engine may apply a first member of the set of design choices to a default QR code and generate an interim QR code. The AI engine may apply a second member of the set of design choices to the interim QR code and generate a resultant QR code. The resultant QR code may include error correction code for restoring information encoded in a threshold percentage of modules included in a data zone of the default QR code.

The AI engine may be configured to apply the set of design choices such that a pattern of modules defining the data zone of the default, interim and resultant QR codes all trigger the same target action when scanned. Generating the resultant QR code may include altering at least one member of the set of the design choices such that the resultant QR code includes a different arrangement of modules than the interim QR code and a different arrangement of modules than the default QR code.

An arrangement of modules may differ based on a position of dark or light modules. An arrangement of modules may differ based on sizes, color or other attributes of modules. For example, the AI engine may generate the resultant QR code by altering a color distribution scheme applied to the interim QR code. Altering the color distribution scheme may include adding color to one or more modules. The altering of the color distribution scheme may include changing a color applied to a module. A module may be processed as a light or dark module by a scanning device before and after altering the color scheme.

The AI engine may be configured to generate the resultant QR code by altering modules within an environmental zone of the interim QR code. Altering modules within the environmental zone may include changing one or more modules from dark to light. Altering modules within the environmental zone may include changing one or more modules from light to dark.

The AI engine may control generation of the interim and resultant QR codes such that the interim and resultant QR codes, when scanned, each trigger the identical target action. The default QR code may also trigger the target action when scanned. The AI engine may test generated QR codes to ensure that the data zone is reliably scannable.

The AI engine may apply one or more aesthetic computational techniques to define an aesthetic appearance associated with the design choices. The AI engine may alter the literal URL-derived design choices to generate a resultant QR code that includes the defined aesthetic appearance and includes a target error correction level and threshold level of scan reliability.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative machine-readable optical label 100. Label 100 may be generated using apparatus and methods described therein. Label 100 includes data zone 101. Data zone 101 includes light and dark modules that encode executable instructions. Label 100 includes alignment marker 103. Alignment marker 103 is defined by an outer border that includes light and dark modules, an inner border of light modules and a dark module in the center.

Label 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules.

Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

Label 100 includes environmental zone 113. Environmental zone 113 includes modules that are not interpreted when label 100 is scanned. Environmental zone 113 may include all parts of label 100 outside of data zone 101. Environmental zone 113 has been constructed such that it has an appearance that, to a human eye, seems contiguous with data zone 101. Environmental zone 113 may be constructed such that it does not interfere with the scanning of data zone 101. For example, apparatus and methods described herein may adjust an arrangement of modules within environmental zone 113 to ensure that the modules of environmental zone 113 do not interfere with a scanning of data zone 101.

Environmental zone 113 includes buffer 111. Buffer 111 are light modules that space data zone 101 apart from modules of environmental zone 113. Apparatus and methods described herein may adjust a width of buffer 111 to ensure that environmental zone 113 does not interfere with a scanning of data zone 101. Apparatus and methods described herein may adjust a width of buffer 111 to ensure that environmental zone 113 does not interfere with a scanning of data zone 101 and environmental zone 113 has an appearance that, to a human eye, seems contiguous with data zone 101.

Label 100 includes circular perimeter 107. Perimeter 107 may be included in environmental zone 113. Apparatus and methods described herein may adjust a line thickness, shape, color or any other suitable design choice of perimeter 107. Apparatus and methods described herein may ensure that perimeter 107 does not interfere with a scanning of data zone 101. Apparatus and methods described herein may arrange modules of environmental zone 113 within a space between data zone 101 and perimeter 107.

Figure 2:
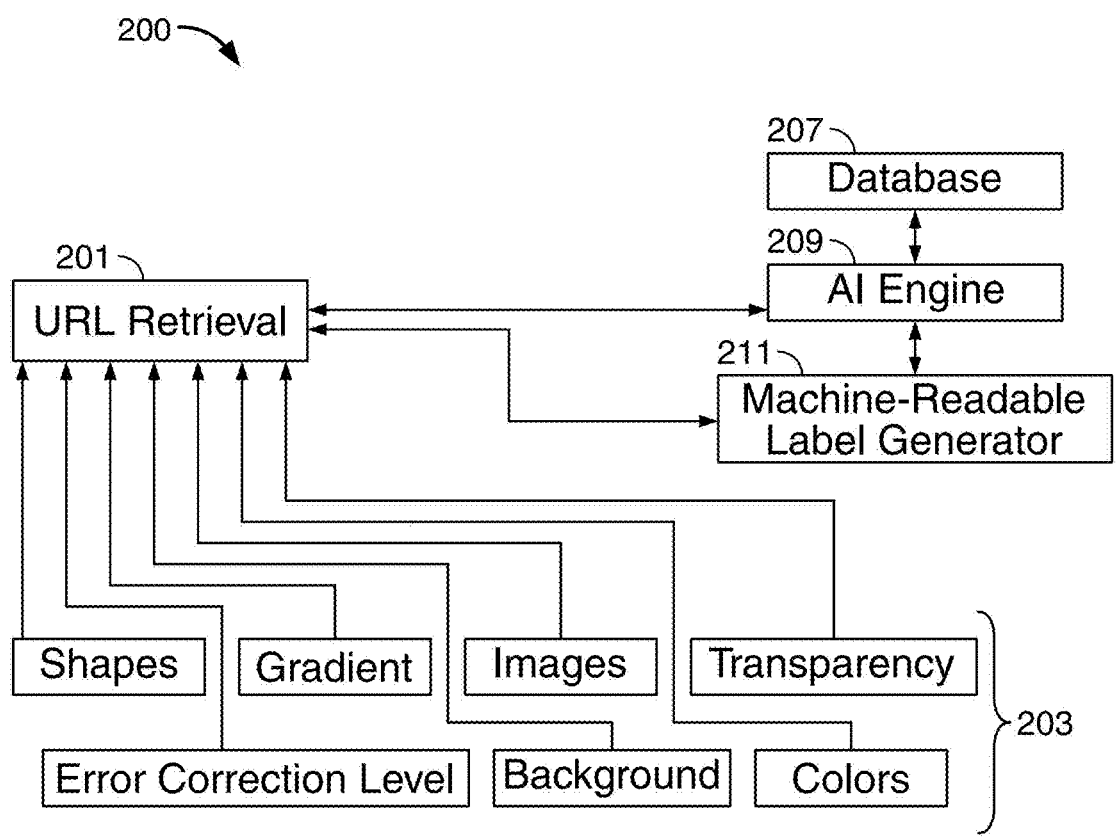
FIG. 2 shows an illustrative apparatus in accordance with principles of the disclosure.

FIG. 2 shows illustrative system 200. System 200 includes components 201, 203, 207, 209 and 211. Components of system 200 may include a processor circuit. The processor circuit may control overall operation of system 200 or one or more of components 201, 203, 207, 209 and 211. The processor circuit may include hardware, such as one or more integrated circuits that form a chipset. The hardware may include digital or analog logic circuitry 202 configured to perform any suitable (e.g., logical) operation.

Each component may include input/output ("I/O") circuitry, which may include a transmitter device and a receiver device and may interface with fiber optic cable, coaxial cable, telephone lines, wireless devices, physical network layer hardware, a keypad/display control device or any other suitable encoded media or devices. Each component may include peripheral devices, which may include counter timers, real-time timers, power-on reset generators or any other suitable peripheral devices.

Each component may include a machine-readable memory. Machine-readable memory may be configured to store, in machine-readable data structures, instructions for: triggering a target action when label 100 is scanned, formulating an arrangement of dark/light modules, translating URL-derived design choices into an arrangement of dark/light modules, or any other suitable functionality.

Components of system 200 and their respective subcomponents may be linked by a system bus, wirelessly or by other suitable interconnections. Components may include RAM, ROM, an I/O module and a non-transitory or nonvolatile memory. The I/O module may include a microphone, button and/or touch screen which may accept user-provided input. The I/O module may include a speaker for providing audio output and a video display for providing textual, audiovisual and/or graphical output.

Software applications may be stored within the non-transitory memory and/or other storage medium. Software applications may provide instructions to the processor circuit that enable components to perform various functions. For example, the non-transitory memory may store software applications such as an operating system, application programs, and an associated database. Some or all of computer executable instructions of the components may be embodied in hardware or firmware. The hardware and firmware may include one or more circuit boards. In some embodiments, the circuit boards may be integrated into a single chip. The chip may be silicon-based.

Components of system 200 may include cloud computing and virtualization implementations of software. Such implementations may be designed to run on a physical apparatus supplied externally by a hosting provider, a client, or other virtualized platform. Components may be operational with distributed computing environments where tasks are performed by remote processing devices that are linked through a communications network. In a distributed computing environment, program modules may be located in both local and remote computer storage media including memory storage devices. Components may rely on a network of remote servers hosted on the Internet to store, manage, and process data (e.g., "cloud computing" and/or "fog computing").

Software application programs, which may be used by components of system 200, may include computer executable instructions for invoking user functionality related to communication, such as email, short message service ("SMS"), and voice input and speech recognition applications. Software application programs may utilize one or more algorithms that generate QR codes based on URL-derived design choices or any other suitable tasks. Logical circuitry 202 may be used to derive QR code(s) from user-selected URL(s).

Components of system 200 may support establishing network connections to one or more remote computers or networks. Each component of system 200 may be a node on a network. Illustrative network connections may include a local area network ("LAN") and a wide area network ("WAN"), and may also include other networks. When used in a LAN networking environment, components may be connected to each other on the LAN through a network interface or adapter. Each component may include a communication circuit. The communication circuit may include a network interface card or adapter.

When used in a WAN networking environment, components may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and components may be operated in a client-server configuration to permit a user to retrieve web pages from a web-based server. Web browsers can be used to display and manipulate data on web pages.

Components of system 200 may be portable devices such as a laptop, tablet, smartphone, other "smart" devices or any other suitable device for receiving, storing, transmitting and/or displaying electronic information. Components of system 200 may include, and may be operational with, numerous other general purpose or special purpose computing system environments or configurations. Examples of computing systems, environments, and/or configurations that may be suitable for use with this disclosure include, but are not limited to, personal computers, server computers, handheld or laptop devices, tablets, "smart" devices, mobile phones, multiprocessor systems, microcomputers, minicomputers, mainframe computers, distributed computing environments that include any of the above systems or devices, and the like.

Components of system 200 may be produced by different manufacturers. Components of system 200 may capture and process data in different formats. For example, components may use different data structures to store captured data. Components of system 200 may utilize different communication protocols to transmit captured data or communicate with other systems. Despite such operational differences, components of system 200 may be configured to operate substantially seamlessly. Interoperability may allow the platform to enter design choices using a first system, utilize a software engine running on a second system to generate an arrangement of modules that implement the design choices and display a QR code generated based on the arrangement of modules on a third system.

Components of system 200 include URL retrieval interface ("URI") 201. URI 201 may allow a user to enter a selection of a URL for using to construct a machine-readable optical label such as a QR code. System may preferably derive illustrative design choices 203 from a user-entered URL. URI 201 may interact with AI engine 209. AI engine 209 may determine an arrangement of modules that generates a QR code in accordance with design choices 203 derived from a user-entered URL. AI engine 209 may store the determined arrangement of modules in database 207.

AI engine 209 may utilize QR code generator 211 to construct a QR code in accordance with the determined arrangement of modules. AI engine 209 may utilize QR code generator 211 to generate and display a QR code that includes each of URL-derived design choices 203. AI engine 209 and QR code generator 211 may be included in a software engine.

Figure 3:
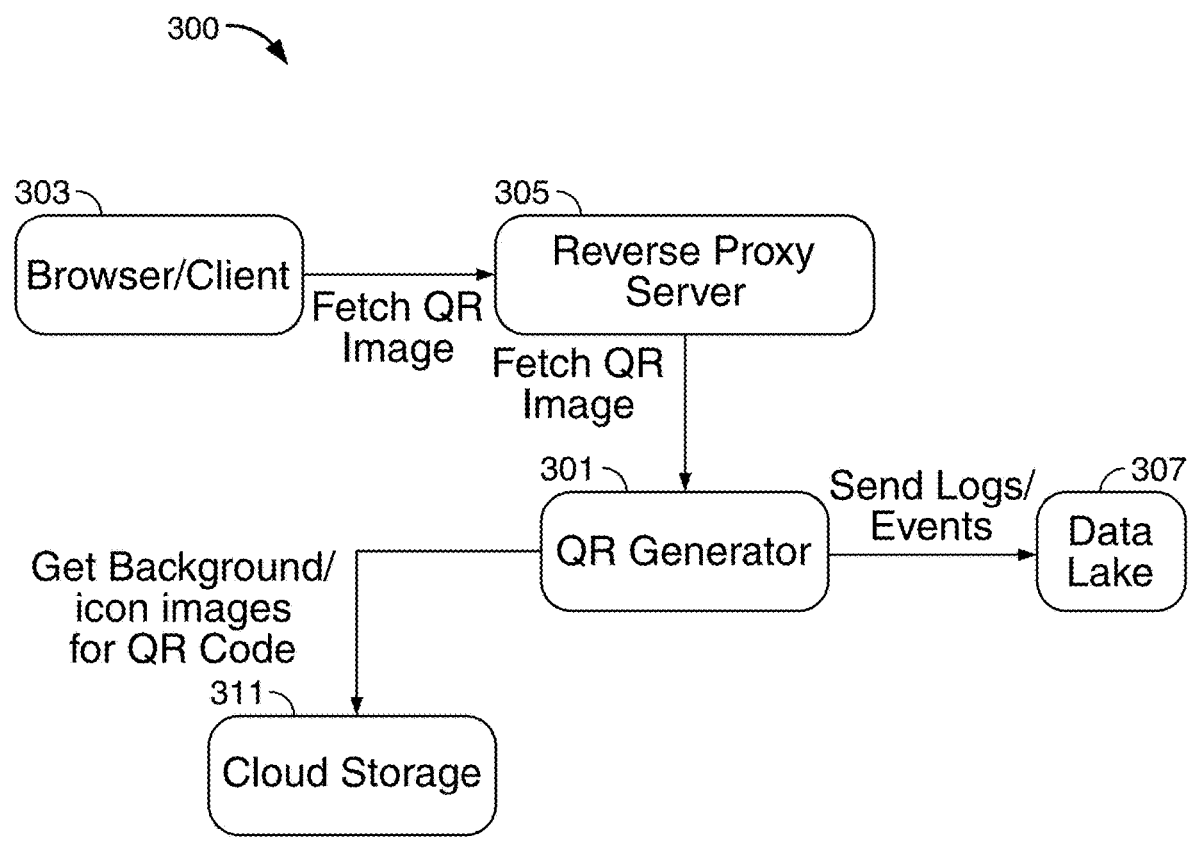
FIG. 3 shows an illustrative apparatus in accordance with principles of the disclosure.

FIG. 3 shows illustrative system 300. System 300 includes components 301-311. Each component of system 300 may include one or more features of components described in connection with system 200.

System 300 shows illustrative components for implementing an application program interface ("API") for server-side rendering of machine-readable optical labels such as QR codes.

The API may allow the platform to embed QR codes in a webpage. The API may allow graphics software to access QR generator 301.

For example, using the API, the platform may draw or create an image, based on the URL, or other artistic work using graphics software. The API may enable the platform to upload the URL to QR generator 301, which will generate a QR code based on the URL or other selection. QR generator 301 may be included in a software engine.

The API may allow users to batch jobs submitted to QR generator 301. For example, the API may allow the platform to submit a plurality of URLs to QR generator 301. QR generator 301 may then generate a QR code for each URL. QR generator may then provide the generated QR code to the user for selection.

In some embodiments, system 300 may not provide server-side storage of QR code images. The API may return a generated QR code image to the requesting user or application for storage.

Reverse proxy server 305 may be deployed in front of a QR generator. Reverse proxy server 305 may access QR generator 301 on behalf of requesting software. Reverse proxy server 305 may return a QR code image produced by QR generator 301 to the requesting user or application as if the user or application is interacting directly with QR generator 301.

However, reverse proxy server 305 may be the only system that interacts directly with QR generator 301. Utilizing reverse proxy server 305 may provide load balancing and security that ensures consistent access to QR generator 301.

System 300 may support two API input types. A first API input type may include settings/attributes associated with a QR code. URL-derived design choices may be illustrative setting/attributes. The API may submit the setting/attributes to QR generator 301 via reverse proxy server 305.

QR generator 301 may return, to the requesting user/application, a QR code image generated based on the setting/attributes. The first API input type, QR generator 301 may utilize the settings/attributes to generate a QR code image without looking up any additional information in database 311.

This first API input type may be useful in connection with providing enterprise level functionality. By avoiding the database lookup, this first API input type minimizes latency between a time the software submits a request for a QR code image and a time the generated QR code image is returned to the software.

A second API input type may accept a pointer to a memory or record location. The second API input type may require looking up settings/attributes stored in a database (e.g., database 311) at the memory or record location. Setting/attributes retrieved from the database may then be submitted to QR generator 301 to generate a QR code image. The generated QR code image is then returned to the requesting user/application. A platform interface, such as URI 201, may store various background and icon images in an associated database, or may be configured to pull background and/or icon images from a URL.

QR generator 301 may generate a QR code image. The generated image may be returned to a requesting user/application.

Generating the QR code image may include image rendering or other digital image processing. For example, QR generator 301 may include any suitable rendering software such as kjua, imagmagick or libvips libraries.

In some embodiments, a background image included in a QR code may be generated outside of QR generator 301. In some embodiments, icon images included in a QR code may be generated by QR Generator 301. The icon images may also be based on a user-selected URL.

System 300 includes browser/client 303. Browser/client 303 may accept one or both of the two API input types described above. QR generator 301 may include AI engine 209. The AI engine 209 may apply machine-generated changes to design choices received from browser/client 303. AI engine 209 may test a QR code image generated by QR generator 301 to ensure that the QR code image is reliably scannable. AI engine 209 may apply machine-generated changes to URL-derived design choices received from browser/client 303 to enhance scan-ability, error correction, aesthetics or any other suitable attribute of a generated QR code image.

For security, system 300 may include reverse proxy server 305 that controls access to QR code generator 301. Reverse proxy server 305 may retrieve images requested by browser/client 303. Reverse proxy server 305 may provide the requested images to QR code generator 301. Using the received images, QR generator 301 may incorporate background or icons needed to construct a QR code in accordance with URL-derived design choices.

Background images or icons may be stored in a cloud storage platform or any other suitable database 311. Logs and events triggered when generating a QR code may be stored in data lake 307.

In certain embodiments, a user may preferably enter a single Uniform Resource Locator ("URL"). Thereafter, the user may preferably retrieve the design system based on the URL.

The design system may include a set of Quick Response ("QR") codes, and, preferably associated landing pages, from among which the user can select.

In a first embodiment, the user may submit or otherwise identify a URL. The embodiment may leverage a third-party tool, such as a tool named Brandfetch located at www.brandfetch.com, to retrieve the hex colors (typically a two-color combination) and logo from the URL of the company.

The connection to the third-party tool may preferably be conducted via an Application Programming Interface ("API"), as described in more detail above, in order to obtain the requested information.

Thereafter, embodiments may apply these inputs in order to generate a set of QR codes from which the user can select.

The embodiments set forth herein can preferably manage a variety of use cases and scenarios to create a scannable and appealing set of codes.

Examples of improvements set forth herein include increasing the logo dimensions to maximize the logo's space vis-à-vis the QR code, creating a dark and light color categorization on the color brightness value to handle unique colors, limiting the level of brightness to enforce 5:4 contrast ratios for background elements, searching to find a preferably minimum number of logos with dark colors, and building logo selection logic.

With respect to the 5:4 contract, or other suitable contrast, the colors in the generated QR code preferably pull two colors and put the darker color in the foreground and the lighter color in the background. In preferred embodiments, the platform may preferably utilize only red colors, blue colors and black colors to increase scannability. In addition, the platform may preferably eliminate near-white colors and/or white colors from the generated code.

The embodiments also preferably enable selection from a number of codes created anywhere from 1-15 or greater. Repeated trials preferably determined that a larger selection of 15 versus a smaller selection of the three increases the chance of generating a code that would meet the user's needs.

In addition, the embodiments preferably include the ability to take a URL and automatically make it a corresponding QR code's scanning destination.

Also, the embodiments may include the ability to cache a URL's parameters so that a URL may preferably only be retrieved once, and then referred back to at a later time(s). In certain embodiments, a brand kit may preferably include identity and design parameters (hex colors, logo) which can be tied together at the account or organization level.

Preferably embodiments may also include logic on how to remove non-relevant parts of a URL provided to direct the third-party tool appropriately. For example, in one particular embodiment, logic (whether embodied in hardware or software) may be deployed to retrieve brand palettes—i.e., color display choices related to the brand—according to the URL.

Such a retrieval may be directed to a primary web domain (based on, or corresponding to, the URL). In such an embodiment, preferably every subdomain/path on the URL may be disregarded by the color palette retrieval. Further, such a retrieval may preferably strip out extraneous information, such as the Instagram handle or other non-core attributes, and only the primary web domain would be retrieved and considered in formulating the colors of the brand palette extraction. As such, the retrieval functions independently of the non-core attributes of the URL and/or of its sub-domains.

Figure 4:
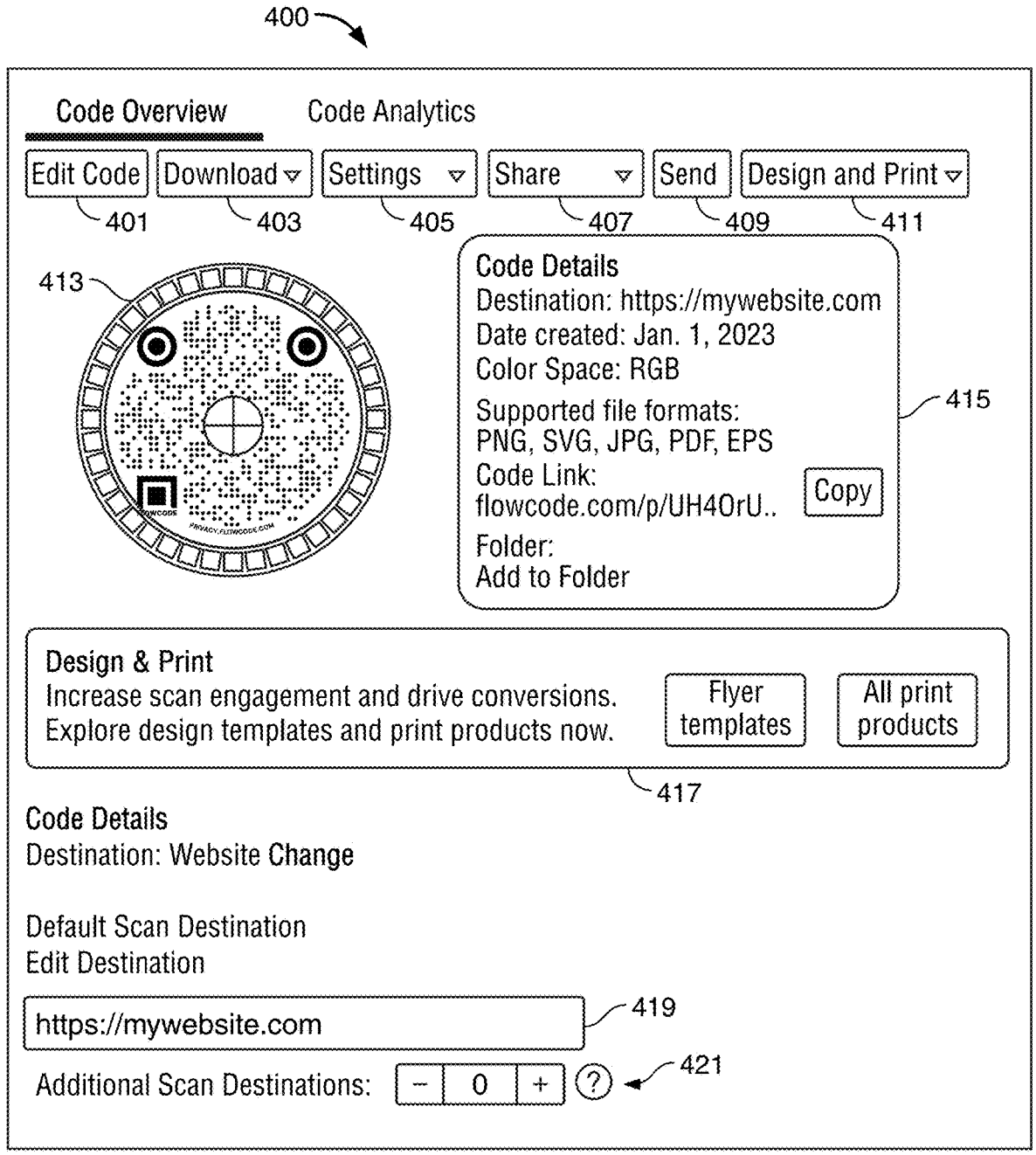
FIG. 4 shows an illustrative user interface in accordance with principles of the disclosure.

FIG. 4 shows a first user interface ("UI") 400 for use with the embodiments set forth herein. At 401, the doe may be edited. For example, the code may be edited with one or more systems and method set forth in co-pending, commonly-assigned U.S. patent application Ser. No. 17/244,032, entitled "Machine-Readable Label Generator", filed on Apr. 29, 2021, which is hereby incorporated herein in its entirety.

At 403, an option to download the code is provided. Settings 405 for the code are shown and the UI also enables sharing the code at 407. The code may be sent at 409, and various design and print functions are enabled at 411 and 417.

A full-size code is shown at 413, and code details 415 are also shown. Finally, the user may be enabled to edit a scan destination for the code at 419, and additional scan destinations may be shown at 421.

Figure 5:
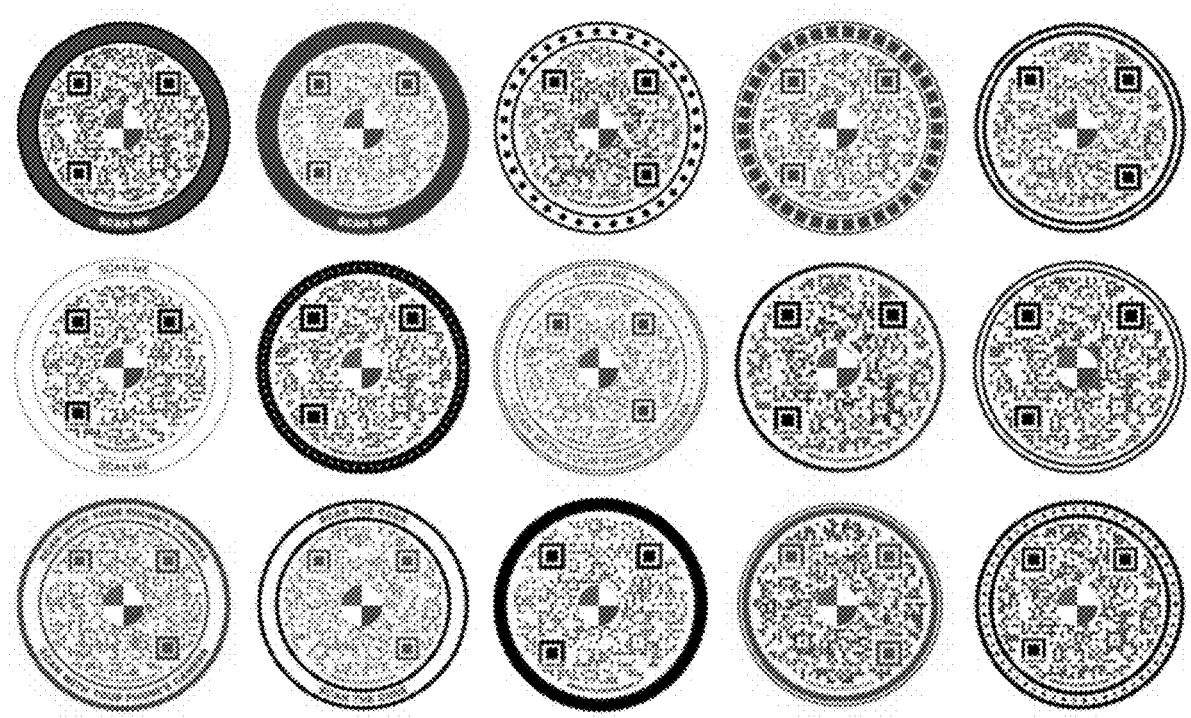
FIG. 5 shows an illustrative set of QR codes in accordance with principles of the disclosure.

FIG. 5 shows a first set of URL-derived codes. It should be noted that the codes shown in FIG. 5 preferably do not necessarily—are not enforced to—follow the parameters disclosed herein for improved scannability. For the purposes of this application, these may be referred to as non-conforming or non-enforced codes.

Figure 6:
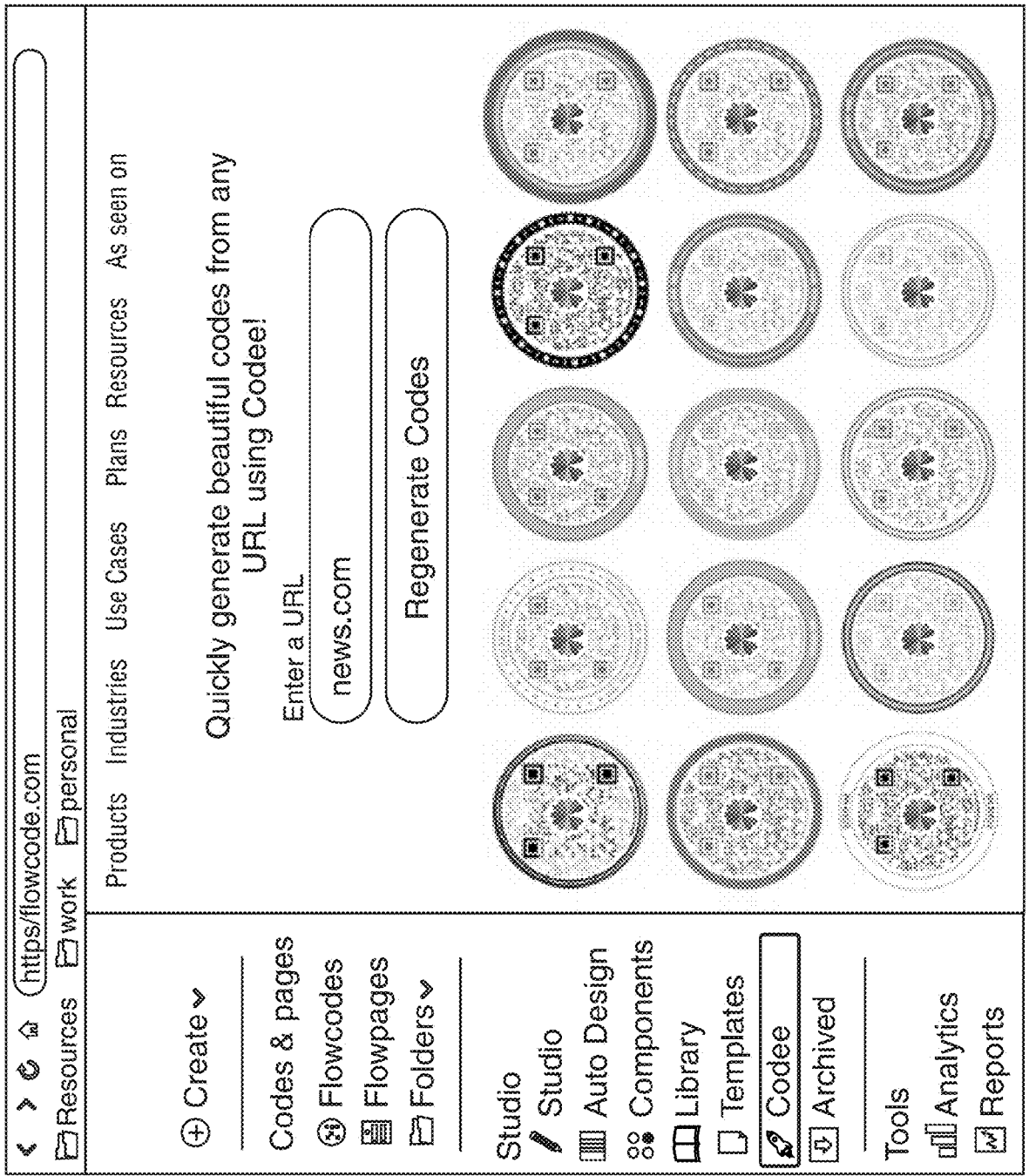
FIG. 6 shows yet another illustrative set of QR codes in accordance with principles of the disclosure.

FIG. 6 shows another set of sample non-conforming codes. As can be seen from the codes, the colors tend toward a lighter hue, and do not only include reds, blues and blacks.

Figure 7:
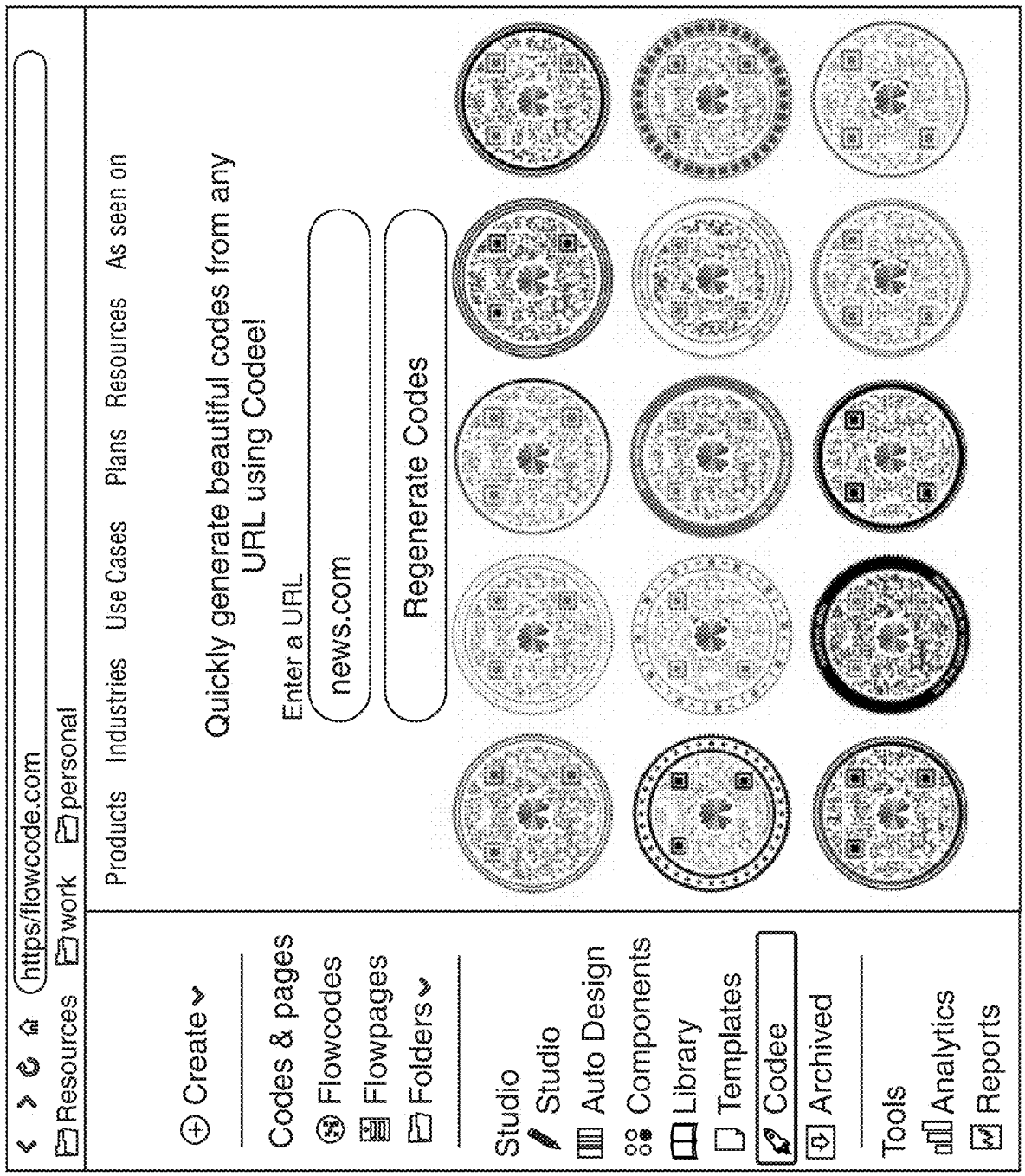
FIG. 7 shows still another illustrative set of QR codes in accordance with principles of the disclosure.

FIG. 7, which is derived from the same URL and/or logo, as FIG. 6 preferably shows conforming or enforced codes. As such the colors in FIG. 7 tend to be red, blue, and/or black, have a lighter background, and a relatively darker foreground with an enforced 5/4 contrast between the background and the foreground and eliminate near-whites and whites.

Figure 8:
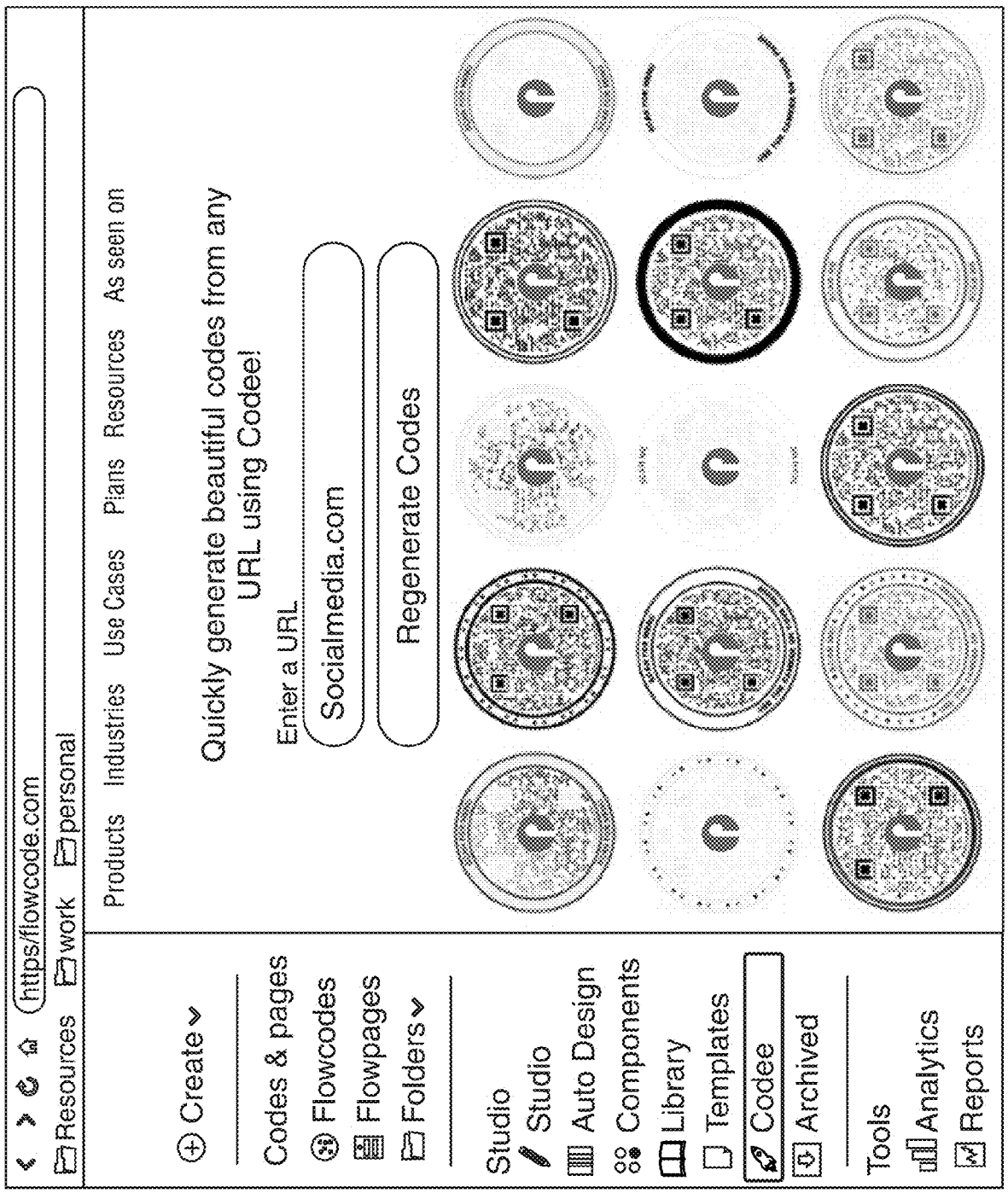
FIG. 8 shows another illustrative set of QR codes in accordance with principles of the disclosure.

FIG. 8 shows another set of sample non-conforming codes. As can be seen from the codes, the colors tend toward a lighter hue, and do not only include reds, blues and blacks.

Figure 9:
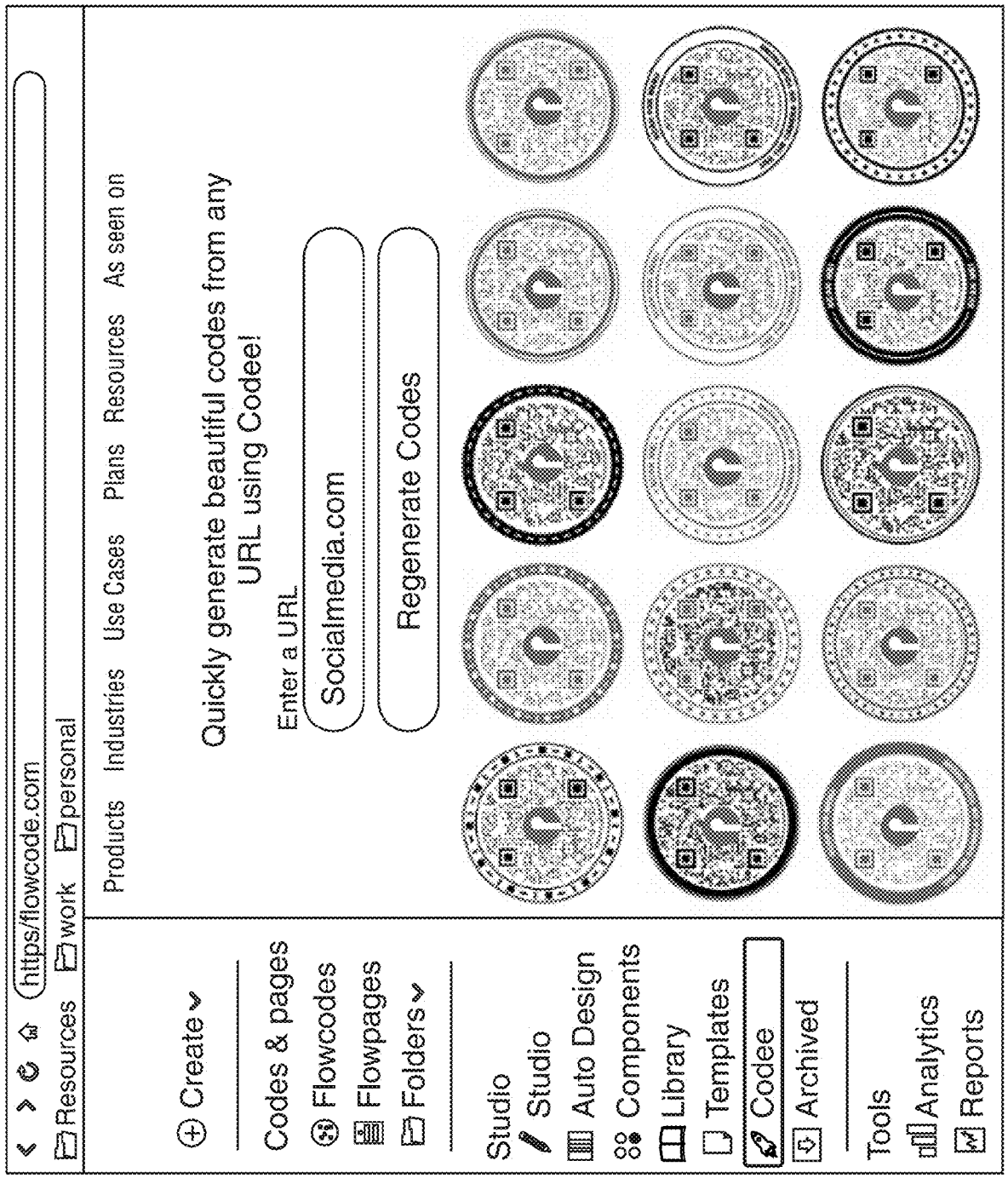
FIG. 9 shows yet another illustrative set of QR codes in accordance with principles of the disclosure.

FIG. 9, which is derived from the same URL and/or logo, as FIG. 8 preferably shows conforming or enforced codes. Similar to the comparison of FIGS. 6 and 7, the colors in FIG. 9 tend to be red, blue, and/or black, have a darker background, and a relatively lighter foreground with an enforced 5/4 contrast between the background and the foreground and eliminate near-whites and whites.

In addition to the ability to generate codes using a URL—systems and methods according to the disclosure preferably enable fetching a user's e-mail domain at account signup. Thereafter, the e-mail domain can be used to run the generation process in order to automatically create a full suite of offline tools. Such generation is preferably independent of action by the creator. Such generation may preferably use the full QR-code suite in order to automatically produce a palate of brand-correct, aesthetic and pleasing QR codes.

In recent years, text-to-image generative AI has made significant advancements in generating realistic and visually appealing images. One exciting application of this technology is its integration with designing branded QR codes. QR codes are ubiquitous in advertising and marketing, providing an easy way to connect customers to product information, promotions, and other digital content. By automating the process of generating branded QR codes using text-to-image AI, companies can create visually pleasing codes that enhance brand identity and stand out in a crowded market. This new automated method has the potential to revolutionize the design of QR codes and increase a code's effectiveness in reaching and engaging with customers.

The approach stated herein to designing customized, branded, QR codes using text-to-image generative AI includes several image processing steps.

An approach according to certain embodiments includes a sequence of 5 steps as described below, and that correspond to the flow diagram shown in FIG. 10:

Creation of images using text-to-prompt generative AI through Stable Diffusion: The first step in the auto-design process according to the embodiments is to generate the underlying assets used for the QR code design.

Images for brands can be retrieved from third-party, external sources (such as BrandFetch). In some embodiments, the platform may, for unique code designs, bespoke campaigns or individual creators, rely on generative AI to provide the underlying asset. Stable Diffusion may represent such a generative AI. Stable Diffusion is a subdomain within the field of AI that enables individuals to generate images in response to input prompts.

More specifically, stable diffusion represents a field that utilizes advanced, transformer-based, deep learning architectures to translate human text into images. Different Stable Diffusion model checkpoints can be used to provide different stylistic interpretations of the prompt as needed. At these checkpoints, the software may leverage pretrained models or train a custom model.

Figure 10:
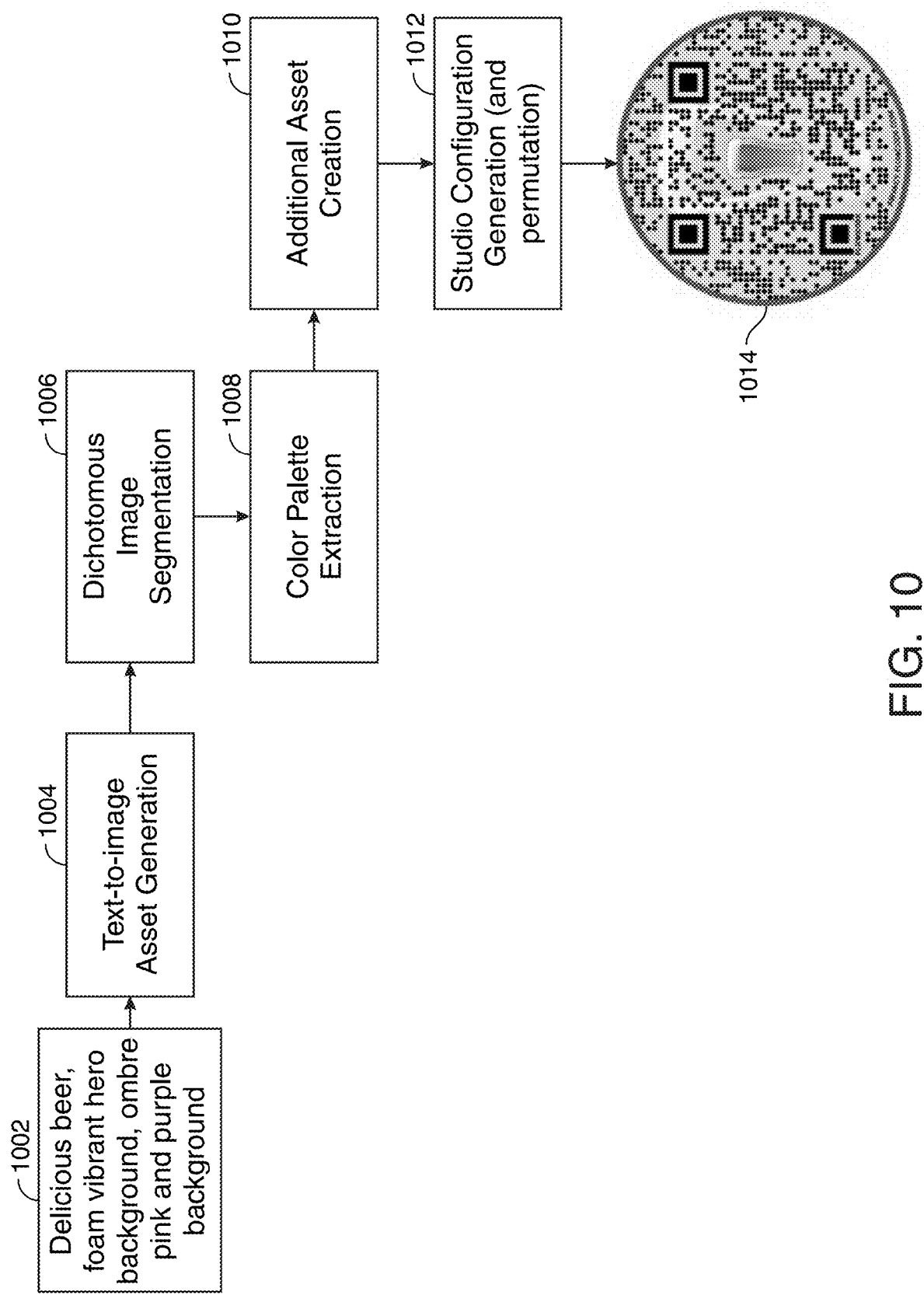
FIG. 10 shows an illustrative flowchart in accordance with principles of the disclosure.

FIG. 10 shows an illustrative flow chart of a method according to the embodiments. At 1002, derived text is provided. The text reads, "[d]elicious beer, foam vibrant hero background, ombre pink and purple background. At 1004 text-to-image asset generation is invoked.

Step 1006 involves dichotomous image segmentation.

Application of dichotomous image segmentation may be as follows: For each custom, auto-designed code, an underlying base image may be generated starting from step 1002, above.

In order to use the image from the generative model, the platform may post-process the image to extract foreground objects for the design. Singular foreground objects become the centerpiece of the customized QR code—that is, the foreground image may serve as a custom created logo for a user.

In order to efficiently and effectively extract the foreground image from the background image, Dichotomous Image Segmentation may be used to derive image masks for the foreground and the background images. This approach can be fast and effective.

Derivation of a brand color palette from assets may include deriving two-color palettes. While this disclosure is directed to two-color palettes, it should be noted that other numbers of colors, such as 3, 4 or 5 or other suitable number of colors, may also be used without departing from the scope of the current disclosure.

In certain embodiments, these two-color palettes can be derived from the segmented image, as shown at step 1008—the primary foreground palette as well as the secondary background palette. It should be noted that, while FIG. 10 is shown as leveraging text-to-image asset generation in 1004 to create an image for use with dichotomous image segmentation, as shown in 1006, in some embodiments, steps 1002 and 1004 can be skipped and a preferably color image could itself be uploaded directly for dichotomous image segmentation 1006.

Both of these palettes are preferably extracted separately from the individual pixels of each image. The predominant colors from the underlying image, in a process referred to herein as hierarchical clustering, are extracted into a color matrix based on the visibility of discrete colors in the image. It should be noted that the visibility is determined by a threshold against the maximum pixel depth allowed in an 8-bit jpeg image (i.e., 255 on a 0-index scale).

The pixels that are determined to be visible are then clustered into k groups using a k-means clustering algorithm. The centroids of these k groups form the basis of the color palette. Lastly, these k groups are filtered by hue so that colors groups that are too similar can be eliminated. Accordingly, the optimal color palette forms a subset of the basis that spans most of (if not the entire) image.

Creation of additional image assets: The color palettes and the extracted foreground image can be used to create several additional brand assets. Several candidate background images can be created—that is, images that exist behind the QR data pattern on the code.

In one example of the foregoing, the foreground and background color palettes may be used to create radial gradient images, which serve as a canvas for additional processing. On top of the gradient canvas, the original foreground extracted image from 1004 may be superimposed. Finally, an alpha layer may be applied to blend transparency into the newly-generated asset.

Assembly of the QR-code generator studio configuration objects: From step 1010—multiple assets have been created. The multiple assets can be combined in many permutations to assemble QR-code generator studio configuration objects. It should be noted that the presumed knowledge of the generator may preferably be limited to just the API of the QR-code generator. The generator may create random, unique permutations of brand assets (i.e., background images, colors, foreground images, etc.) to assemble many QR-code generator configuration objects. These objects can be submitted to render one or more QR-codes to present to a user, as shown at 1012. A sample generated QR code permutation is set forth at 1014.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the correspondence data hub computer program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers as well as any server or servers. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Thus, apparatus and methods LEVERAGING A UNIFORM RESOURCE LOCATOR ("URL") TO PRODUCE A CORRESPONDING MACHINE-READABLE LABEL are provided. Persons skilled in the art will appreciate that the present invention can be practiced by other than the described embodiments, which are presented for purposes of illustration rather than of limitation.

What is claimed is:

1. A software platform for generating a quick-response ("QR") code comprising a data zone, a position detection pattern and an environmental zone, the software platform comprising:
   a memory storing an application programming interface ("API"), said API for retrieving a Uniform Resource Locator ("URL") from a selected location, said URL comprising a logo;
   a processor for building the data zone, the position detection pattern and the environmental zone of the QR code based on the URL;
   wherein:
   the processor constructs the data zone by increasing a set of logo dimensions with respect to an overall area of the data zone; and
   the processor is further configured to create a dark and light color categorization of a plurality of colors derived from the URL.

2. The software platform of claim 1 wherein the processor is configured to limit a level of brightness to enforce 5:4 contrast ratios for a set of background elements in the QR code with respect to a set of foreground elements in the QR code.

3. The software platform of claim 1 wherein the processor is configured to pull two colors from the URL and place the darker color in the foreground and the lighter color in the background.

4. The software platform of claim 3 wherein the memory stores logo selection logic, said logo selection logic that instructs the processor to search the URL to identify a pre-determined minimum number of color logos in a specified color band.

5. The software platform of claim 1 wherein the processor is configured to select only red colors, blue colors and black colors to form the QR code.

6. The software platform of claim 1 wherein the processor is configured to eliminate near-white colors and/or white colors from the QR code.

7. The software platform of claim 1 wherein the processor is further configured to search the URL to find a predetermined minimum number of dark-color logos.

8. A method for mining a Uniform Resource Locator ("URL"), the method utilizing a computer processor and one or more non-transitory computer-readable media storing computer executable instructions, the instructions when executed by the computer processor generate a quick-response ("QR") code comprising a data zone, a position detection pattern and an environmental zone, the method comprising:
   storing an application programming interface ("API") in a memory, said API for retrieving a Uniform Resource Locator ("URL") from a selected location, said URL comprising a logo;
   building, using the processor, the data zone, the position detection pattern and the environmental zone of the QR code based on the URL;
   creating, using the processor, a dark and light color categorization of a plurality of colors derived from the URL.

9. The method of claim 8 further comprising constructing the data zone by increasing a set of logo dimensions with respect to an overall area of the data zone.

10. The method of claim 8 further comprising limiting a level of brightness to enforce 5:4 contrast ratios for a set of background elements in the QR code with respect to a set of foreground elements in the QR code.

11. The method of claim 8 further comprising identifying two fundamental colors from the URL and placing the darker color of the two fundamental colors in the foreground and the lighter color of the two fundamental colors in the background.

12. The method of claim 8 further comprising selecting only red colors, blue colors and black colors to form the QR code.

13. The method of claim 8 further comprising eliminating near-white colors and/or white colors from the QR code.

14. The method of claim 8 further comprising searching the URL to find a pre-determined minimum number of dark-color logos.

15. The method of claim 14 wherein the memory stores logo selection logic, said logo selection logic for instructing the processor to search the URL to identify a pre-determined minimum number of color logos in a specified color band.

* * * * *